United States Patent Office 3,043,868
Patented July 10, 1962

3,043,868
N-XENYLALKANOYLAMINOALKANOIC ACIDS AND ESTERS THEREOF
Carl Peter Krimmel, Mundelein, Ill., assignor to G. D. Searle & Co., Chicago, Ill., a corporation of Delaware
No Drawing. Filed Dec. 9, 1959, Ser. No. 858,321
7 Claims. (Cl. 260—518)

The present invention relates to N-xenylalkanoylaminoalkanoic acids and esters thereof and more particularly to the compounds of the general structural formula

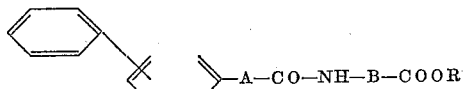
—A—CO—NH—B—COOR and their pharmaceutically acceptable salts, wherein A and B are lower alkylene radicals and R is a member of the class consisting of hydrogen and lower alkyl radicals. In the foregoing structural formula, the radicals A and B represent bivalent, saturated, aliphatic hydrocarbon radicals of from 1 to 8 carbon atoms; these radicals are derived from a straight-chain or branched-chain aliphatic hydrocarbon. They include radicals such as methylene, ethylene, propylene, butylene, amylene, or polymethylene radicals such as trimethylene, tetramethylene, pentamethylene, hexamethylene, heptamethylene, and octamethylene. Of special importance for the purposes of this invention are the compounds in which A represents a radical of the type

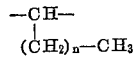
—CH—
|
(CH$_2$)$_n$—CH$_3$ wherein $n$ is an integer such as 0, 1, 2, 3, 4, 5, and 6.

The radical R can be hydrogen or a lower alkyl group such as a methyl or ethyl, or a straight-chain or branched propyl, butyl, amyl, or hexyl group.

The acids of the foregoing structural formula in which R is hydrogen readily form salts with alkali metals, alkaline earths, ammonia and organic amines; these salts are equivalent to the acid for the purposes of this invention.

The compounds of this invention are valuable because of their pharmacological effects. Specifically, they are inhibitors of hepatic cholesterol synthesis. They have the power to inhibit incorporation of mevalonic acid into non-saponifiable cholesterol precursors. They reduce biliary cholesterol and cholic acid concentration and excretion.

The compounds of this invention can be prepared conveniently by using as starting materials acids of the general structural formula Xenyl—A—COOH Preparations of these acids have been described by Blicke and Grier (J. Amer. Chem. Soc. 65:1725; 1943), Hey and Wilkinson (J. Chem. Soc. 1940:1030), and Bradsher and Jackson (J. Amer. Chem. Soc. 73:3235; 1951 and ibid. 76:734,, 4140; 1954). Isomers and homologs can be prepared by use of equivalent amounts of isomeric and homologous starting materials.

The foregoing acids can be converted to their acid halides by conventional methods such as treatment with thionyl chloride. The resulting acid halides of the type Xenyl—A—CO—Halogen can then be condensed with an amino acid of the formula

NH$_2$—B—COOH suitably in the presence of an excess of alkali (e.g. alkali metal hydroxide or alkaline earth metal hydroxide) to yield the corresponding salt of the type Xenyl—A—CO—NH—B—COO—M wherein M represents one equivalent of cation.

Alternatively, an acid of the type

Xenyl—A—COOH can be treated with an ester of an amino acid of the structural formula

NH$_2$—B—COOR in the presence of a reagent such as dicyclohexylcarbodiimide. In this reaction there is formed an ester of the formula Xenyl—A—CO—NH—B—COOR and dicyclohexylurea as a by product. As an additional by-product there can be obtained the 1,3-dicyclohexyl-1-xenylalkanoylurea of the type Xenyl—A—CO—NZ—CO—NHZ wherein Z is a cyclohexyl radical.

The compounds which constitute this invention and their preparation will appear in further detail from a consideration of the following examples which are presented for the purpose of illustration only and are not to be construed as limiting the invention in spirit or in scope. In these examples quantities are indicated as grams (g.) and milliliters (ml.).

*Example 1*

A solution of 14.4 g. of sodium hydroxide and 9.0 g. of glycine in 350 ml. of water is added in one batch, with vigorous stirring, to a freshly prepared solution of 26.0 g. of α-(p-xenyl)butyryl chloride in 350 ml. of acetone. The addition is slightly exothermic and results in the formation of a clear homogenous solution. The acetone is removed from the reaction mixture by evaporation on the steam bath. The remaining aqueous solution is treated with ice whereupon the sodium salt of N-[α-(p-xenyl)-butyryl]-glycine separates as a thick white slurry. The stirred mixture is rendered acid with hydrochloric acid whereupon white granules separate. The granules are broken up, filtered, washed with water and dried in a steam cabinet. This dried product is recrystallized twice from boiling toluene and decolorized with charcoal. The N-[α-(p-xenyl)butyryl]glycine, thus obtained, melts at about 164–166° C. The compound has the structural formula

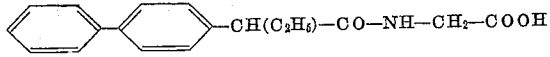—CH(C$_2$H$_5$)—CO—NH—CH$_2$—COOH

*Example 2*

A solution of 14.4 g. of sodium hydroxide and 10.7 g. of β-alanine in 350 ml. of water is added in a single portion, with vigorous agitation, to a freshly prepared solution of 26.0 g. of α-(p-xenyl)butyryl chloride in 350 ml. of acetone. The addition is slightly exothermic and results in the formation of a clear homogenous solution. The acetone is removed by evaporation on the steam bath. The residual aqueous solution is iced and acidified with hydrochloric acid. A white gum separates which solidifies on standing. This solid is collected on a filter, washed with water, and dried in a steam cabinet. After two recrystallizations from boiling toluene with use of decolorizing carbon there are obtained white crystals of N-[α-(p-xenyl)butyryl]-β-alanine melting at about 152–155° C. The N-[α-(p-xenyl)butyryl]-β-alanine thus formed has the structural formula

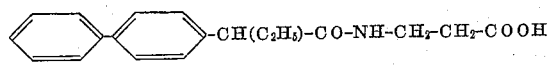—CH(C$_2$H$_5$)—CO—NH—CH$_2$-CH$_2$—COOH

*Example 3*

Substitution of 12.4 g. of γ-aminobutyric acid for the β-alanine used in the preceding example yields γ-{N-[α-(p-xenyl)butyryl]}aminobutyric acid in white needles melting at about 143–146° C. The compound has the structural formula

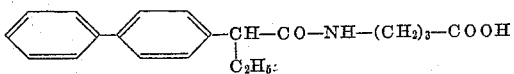

*Example 4*

A solution of 15.0 g. of α-(p-xenyl)octanoic acid and 7.5 g. of the hydrochloride of the methyl ester of β-alanine in 85 ml. of dichloromethane is treated with 4.3 g. of triethylamine, an amount which is slightly less than that required for neutralization of the hydrogen chloride. The further dropwise addition at room temperature of 10 g. of dicyclohexylcarbodiimide in 40 ml. of dichloromethane causes warming and separation of a precipitate. The reaction mixture is stirred for an hour and then evaporated to dryness on a steam bath under vacuum. The residue is triturated with three 100 ml. portions of ethyl ether, filtered and washed with ether. The filter cake consists of dicyclohexylurea. The combined ethereal solutions are washed successively with dilute sodium hydroxide, water, dilute hydrochloric acid and again with water. They are then dried over sodium sulfate and reduced under vacuum to an oil which crystallizes on standing. There is thus obtained the methyl ester of N-[α-(p-xenyl)-octanoyl]-β-alanine. It has the structural formula

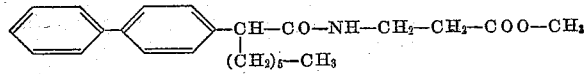

*Example 5*

In a solution of 90 ml. of methanol, 20 ml. of water and 4 g. of sodium hydroxide are dissolved 10.0 g. of the methyl ester of N-[α-(p-xenyl)octanoyl]-β-alanine. This solution is refluxed for an hour after which 400 ml. of cold water are added. The diluted hydrolysate is washed with ethyl ether, filtered, acidified with hydrochloric acid, and chilled. The resulting crystalline solid is collected on a filter, washed, dried, and dissolved in ethyl ether. Concentration of the ethereal solution, slow dilution with petroleum ether to the point of turbidity, and standing yields a crystalline product. After vacuum drying, the N-[α-(p-xenyl)octanoyl]-β-alanine, thus obtained, melts at about 119–120° C.

*Example 6*

In the procedure of Example 4, 10.6 g. of p-xenylacetic acid are substituted. In the process the by-product, dicyclohexylurea, is obtained as a solid which is removed by direct filtration from the dichloromethane solution. After evaporation of the dichloromethane filtrate to dryness under vacuum, the residue is washed with water, dried, triturated with ethyl ether and recrystallized from a mixture of acetone and petroleum ether to yield the methyl ester of N-(p-xenyl)acetyl-β-alanine in the form of white crystals melting at about 158–160° C.

Substitution of an equal amount of o-xenyl-acetic acid or m-xenylacetic acid for the p-isomer yields the methyl esters of N-(o-xenyl(acetyl-β-alanine and N-(m-xenyl)-acetyl-β-alanine respectively. These compounds have the structural formula $C_6H_5$—$C_6H_4$—$CH_2$—CO—NH—
$CH_2$—$CH_2$—COO—$CH_3$ The foregoing methyl esters are hydrolyzed to the N-xenylacetyl-β-alanines as in Example 5. In the case of the p-isomer crystallization is carried out as follows. A 3.5 g. sample of the crude acid is dissolved in a warm mixture of 20 ml. of water, 125 ml. of methanol, and 15 ml. of pyridine. This mixture is then acidified with glacial acetic acid. Crystallization takes place upon cooling. N-(p-xenyl(acetyl-β-alanine is thus obtained as a white crystalline solid which melts at about 218–220° C.

*Example 7*

To a mixture of 20.6 g. of dicyclohexylcarbodiimide, 24.0 g. of γ-(p-xenyl)butyric acid and 500 ml. of anhydrous ethyl ether is added one equivalent of an ethereal solution of the ethyl ester of glycine prepared from its hydrochloride by treatment with aqueous potassium carbonate, ether extraction and drying of the extract over solid potassium carbonate. An immediate precipitation of dicyclohexylurea results. The precipitate is removed by filtration and the filtrate is evaporated to dryness on a steam bath. The residue is dissolved in hot petroleum ether and cooled. The resulting ethyl ester of N-[γ-(p-xenyl)butyryl]glycine is dried in air. It melts at about 83–87° C. The compound has the structural formula

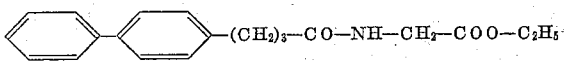

Further concentration of the filtrate yields a crystalline solid melting at about 75–120° C. The compound can be purified by dissolving in hot anhydrous 2-propanol, slow dilution with distilled water, seeding and gradual cooling to room temperature. The resulting white powdery precipitate is dried in a steam cabinet and melts at about 124–127° C. There is thus obtained 1,3-dicyclohexyl-1-[γ-(p-xenyl)butyryl]urea of the structural formula

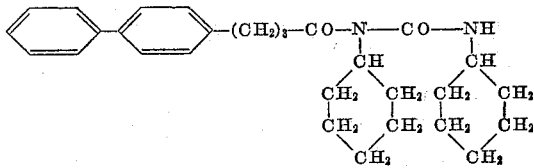

*Example 8*

The ethyl ester of N-[γ-(p-xenyl)butyryl]glycine is hydrolyzed by refluxing 3.3 g. of it for 3 hours with a solution of 0.4 g. of sodium hydroxide dissolved in 20 ml. of water and 20 ml. of ethanol. The hydrolysate is cooled, passed through a filter and diluted with water. A pale yellow precipitate is thrown down. This is dissolved in hot acetone and the hot solution is acidified with concentrated hydrochloric acid. N-[γ-(p-Xenyl)butyryl]-glycine is recovered by water dilution and dried. It is recrystallized by dissolving in hot butanone and dilution with petroleum ether. After drying the melting point is about 170–176° C.

What is claimed is:

1. A compound of the structural formula

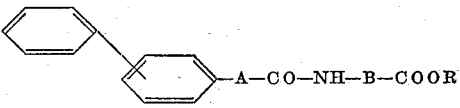

wherein A and B are lower alkylene radicals and R is a member of the class consisting of hydrogen and lower alkyl radicals.

2. A compound of the structural formula

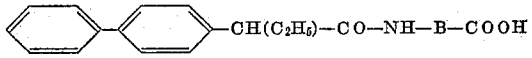

wherein B is a lower alkylene radical.

3. N-[α-(p-Xenyl)butyryl]glycine.
4. N-[α-(p-Xenyl)butyryl]-β-alanine.
5. γ-{N-[α-(p-Xenyl)butyryl]}aminobutyric acid.
6. N-[γ-(p-Xenyl)butyryl]glycine.
7. N-[α-(p-Xenyl)octanoyl]-β-alanine.

References Cited in the file of this patent

UNITED STATES PATENTS 2,179,979     Isler _____ Nov. 14, 1939
2,440,356     Behrens _____ Apr. 27, 1948